United States Patent
Warren et al.

(10) Patent No.: US 12,060,964 B1
(45) Date of Patent: Aug. 13, 2024

(54) INTEGRATED FLEX-SHAFT CAMERA SYSTEM

(71) Applicant: SeeScan, Inc., San Diego, CA (US)

(72) Inventors: Alexander L. Warren, Escondido, CA (US); Michael J. Martin, San Diego, CA (US); Mark S. Olsson, La Jolla, CA (US); Jeffery D. Martin, Julian, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 18/140,488

(22) Filed: Apr. 27, 2023

Related U.S. Application Data

(63) Continuation of application No. 17/014,646, filed on Sep. 8, 2020, now Pat. No. 11,649,917.

(60) Provisional application No. 62/897,141, filed on Sep. 6, 2019.

(51) Int. Cl.
*F16L 55/30* (2006.01)
*G01N 21/954* (2006.01)
*F16L 101/30* (2006.01)

(52) U.S. Cl.
CPC ............ *F16L 55/30* (2013.01); *G01N 21/954* (2013.01); *F16L 2101/30* (2013.01); *G01N 2021/9544* (2013.01); *G01N 2201/062* (2013.01)

(58) Field of Classification Search
CPC ....... E03F 9/005; E03C 1/302; F16L 2101/30; F16L 55/30; F16L 2101/12; F16L 55/28; F16L 55/00; F16L 2101/00; B08B 9/045; B08B 9/043; B08B 9/0436; B08B 9/047; G01N 21/954; G01N 2021/9544; G01N 2201/062
See application file for complete search history.

(56) References Cited

U.S. PATENT DOCUMENTS

| | | | | | |
|---|---|---|---|---|---|
| 5,862,561 A | * | 1/1999 | Irwin | ...................... | B08B 9/045 15/104.31 |
| 5,933,903 A | * | 8/1999 | Irwin | ...................... | B08B 9/045 15/104.33 |
| 5,996,159 A | * | 12/1999 | Irwin | ...................... | E03F 9/005 15/104.31 |
| 2007/0051192 A1 | | 3/2007 | Penza et al. | | |

(Continued)

FOREIGN PATENT DOCUMENTS

| | | | | | |
|---|---|---|---|---|---|
| FR | | 1473248 A | | 3/1967 | |
| WO | WO-2006127095 A1 | * | 11/2006 | ........... | B08B 9/0436 |
| WO | | 2014-025451 A1 | | 2/2014 | |

OTHER PUBLICATIONS

International Searching Authority, "Written Opinion of the International Searching Authority" for PCT Patent Application No. PCT/US2020/049783, Mar. 11, 2021, European Patent Office, Munich.

*Primary Examiner* — Peter J Macchiarolo
*Assistant Examiner* — Anthony W Megna Fuentes
(74) *Attorney, Agent, or Firm* — Steven C. Tietsworth, Esq.; Michael J. Pennington, Esq.

(57) ABSTRACT

Cable handling methods for securing and deploying or retracting one or more cables or hoses into or out of a pipe or cavity allowing inspection of the pipe or cavity are disclosed. In one embodiment a cable is inserted through a cable guide, a flex shaft is attached to the outer surface of the cable guide, and the cable and the flex shaft are deployed into a pipe or cavity to inspect and/or clear an obstruction via a jetter or cutting mechanism.

10 Claims, 15 Drawing Sheets

(56) References Cited

U.S. PATENT DOCUMENTS

2009/0038093 A1* 2/2009 Irwin ................ B08B 9/045
                                              15/104.095
2016/0305891 A1* 10/2016 Olsson ................ E03F 7/12
2018/0038093 A1* 2/2018 Olsson ................ H01B 7/02

* cited by examiner

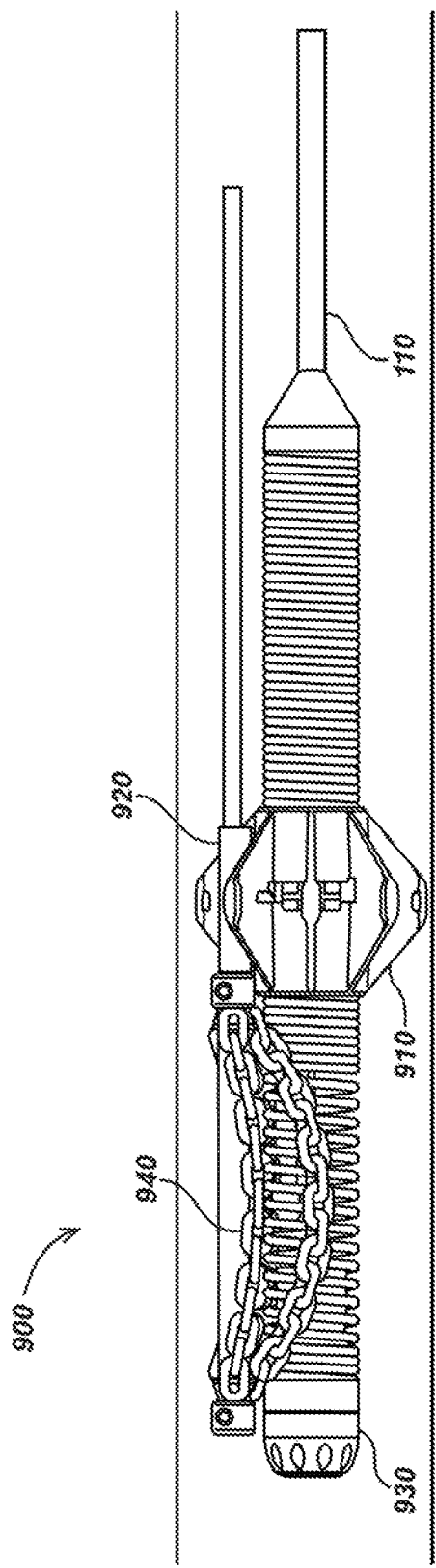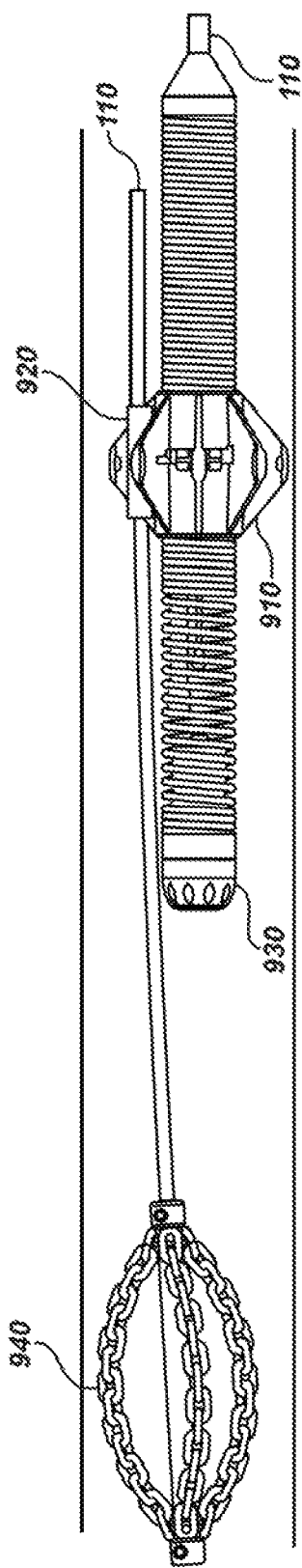
FIG. 9A
FIG. 9B

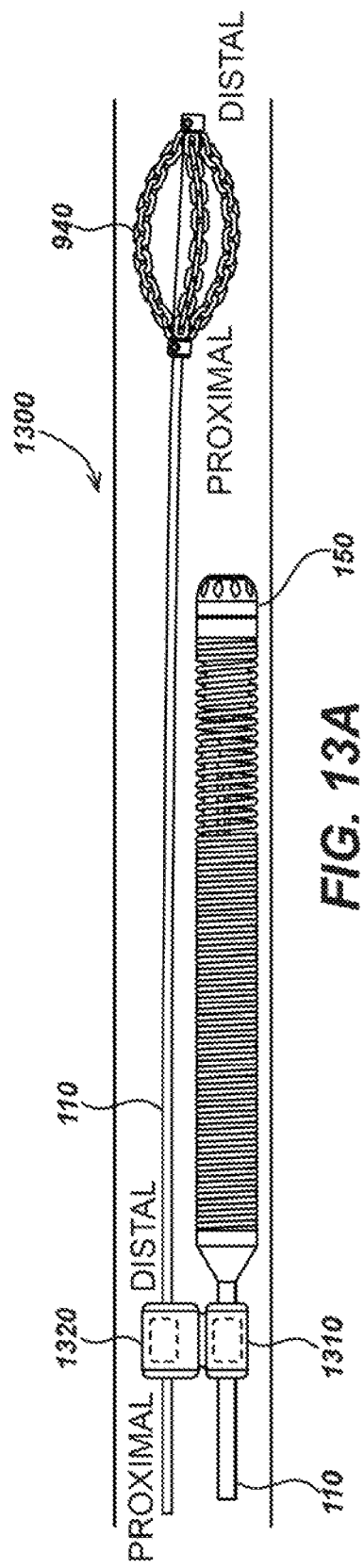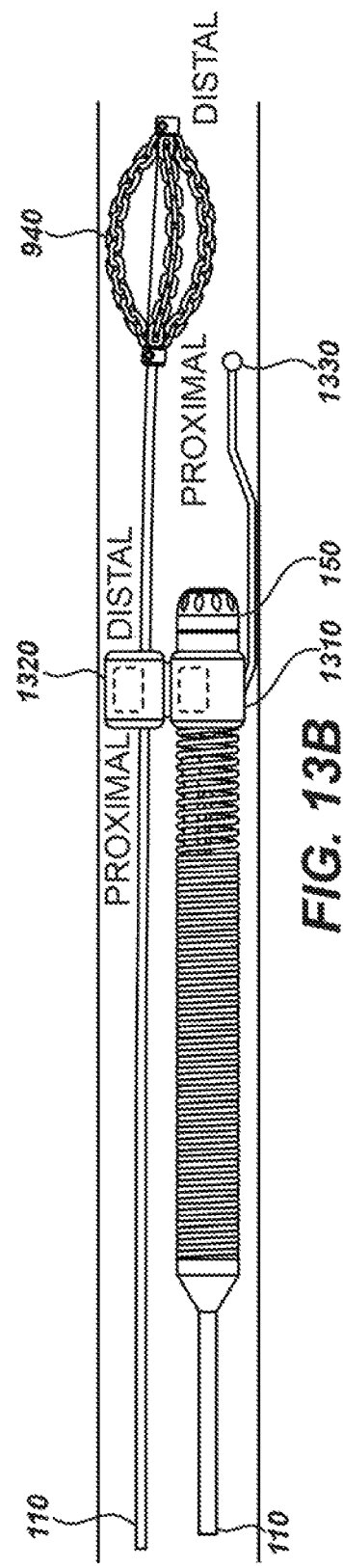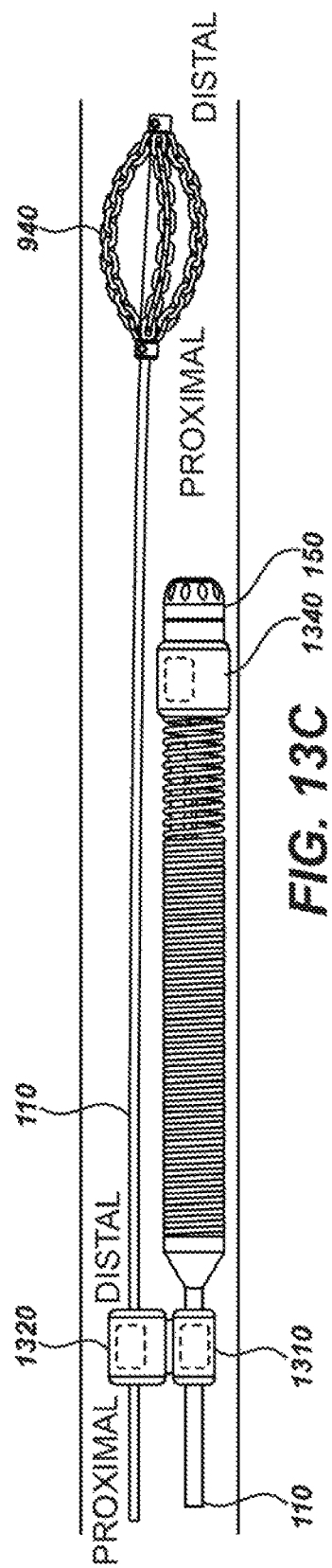

INTEGRATED FLEX-SHAFT CAMERA SYSTEM

CROSS-REFERENCE TO RELATED APPLICATIONS

This application claims priority under 35 U.S.C. § 119(e) to U.S. Provisional Patent Application Ser. No. 62/897,141, entitled INTEGRATED FLEX-SHAFT CAMERA SYSTEM WITH HAND CONTROL, filed Sep. 6, 2019, the content of which is incorporated by reference herein in its entirety for all purposes.

FIELD

This disclosure relates generally to cable handling devices, methods and systems for inspection of pipes or cavities. More specifically, but not exclusively, this disclosure relates to devices, methods and systems for deploying and retracting at least one camera and additional cables and/or hoses into and out of a pipe or cavity for applications such as plumbing and underground utility location.

BACKGROUND

FIG. 1 illustrates the traditional method of deploying one or more cables or hoses into a pipe or cavity. Typically, a user such as a plumber or utility worker would deploy one or more cables or hoses by using their hands (with or without gloves depending on the application) to feed the cable or hose into a pipe or cavity by grabbing the cable or hose and pushing it in a forward direction. Then in order to retract or remove the cable or hose from the pipe or cavity, they would exert force in the opposite or backward direction by pulling the cable or hose out of the pipe or cavity. While it is possible to deploy or retract (push or pull) more than a single cable and/or hose at a time, it is often cumbersome and can be quite difficult if the cables or hoses have different dimensions, external surfaces and/or flexibilities. Furthermore, keeping the cables and/or hoses together at the point of deployment or retraction, or at another point along the length of the cables and/or hoses inside a pipe or cavity is extremely difficult. Accordingly, there is a need in the art to address the above-described problems, as well as other problems, associated with handling cables or hoses for pipe or cavity inspection, cleaning and maintenance.

SUMMARY

This disclosure relates generally to cable handling devices, methods and systems for inspection of pipes or cavities. More specifically, but not exclusively, this disclosure relates to devices, methods and systems for deploying and retracting at least one camera and additional cables and/or hoses into and out of a pipe or cavity for applications such as plumbing and underground utility location.

In another aspect, this disclosure relates to a configuration wherein the cable handling device deploys or retracts one or more cables and/or hoses by attaching various clips, clamps, and pipe guides along desired locations of the one or more cables and/or hoses to provide, among other things, cable management, cable steering and/or cable protection.

In another aspect, the disclosure relates to a configuration wherein the cable handling device works in conjunction with remotely controlled clamps dispersed along desired locations of the one or more cables and/or hoses to provide, among other things, cable management, cable steering and/or cable protection.

Various additional aspects, features, and functions are describe below in conjunction with the Drawings.

BRIEF DESCRIPTION OF THE DRAWINGS

FIGS. 9A, 9B, 9C, 9D and 9E are illustrations of embodiments of a pipe guide integrated with a cable/hose stop in accordance with certain aspects of the present invention.

FIGS. 13A, 13B and 13C are illustrations of embodiments using remotely controlled clamping mechanisms.

DETAILED DESCRIPTION

Figure 1:
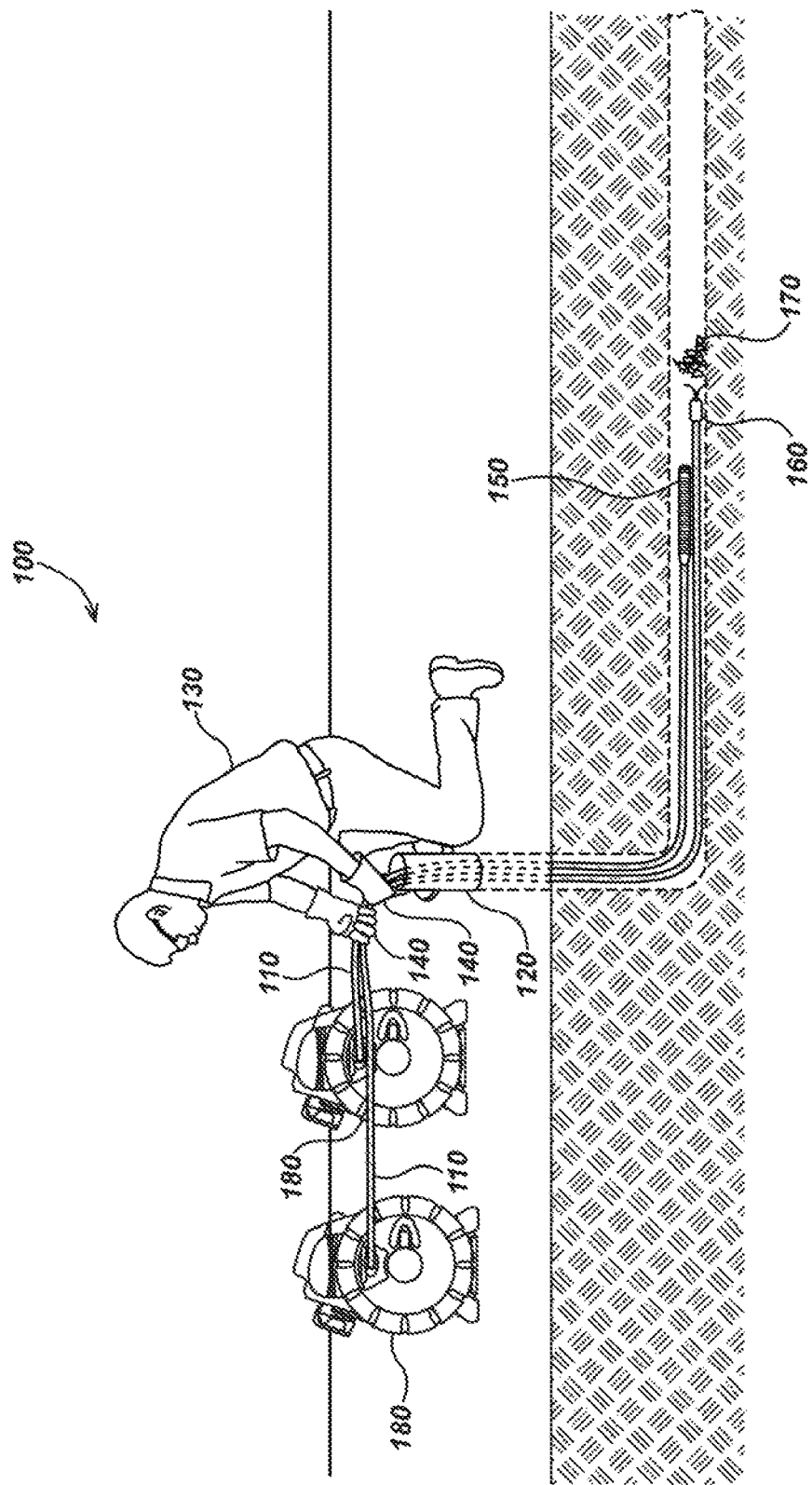
FIG. 1 is an illustration of a typical method for manually feeding one or more cables or hoses into or out of a pipe or cavity as needed for inspection, as known in the prior art.

In one aspect this disclosure relates to cable handling device for inspection of pipes or cavities. The cable handling device may include a housing for at least partially enclosing one or more cables or hoses at least one coupling mechanism integrally attached to the housing, and a coupling control for coupling and decoupling the one or more cables or hoses. The cable handling device allows a user to deploy and/or retract one or more cables and/or hoses. The cable handling device may be used to deploy various tools into a pipe or cavity for inspection and/or cleaning. For instance, in some embodiments a cable may be attached to a camera assembly and the camera may be deployed into a pipe or cavity to provide images to a user display so that a user can inspect the inside of the pipe and/or cavity.

In some embodiments a user may also deploy a flex-shaft. A flex-shaft provides a flexible shaft that allows rotational power to be supplied at one end and transmitted to a rotationally operated mechanism at the other end, as an example, a cutting mechanism. In some embodiments, the cutting mechanism may be a blade, a cutting string, a chain knocker, or another cutting device known on the art. In some embodiments the user may deploy a hose attached to a nozzle or jetter to supply pressurized water or other fluid through the nozzle or jetter. The cable handling device allows a user to deploy and/or retract multiple cables at once more quickly and conveniently than by just using their hands. The cable handling device keeps one or more cables and/or hoses together inside the cable handling device making the one or more cables and/or hoses easier to manage. In some embodiments a user simply inserts one or more cables into the cable handling device either by threading the one or more cables or hoses through the device, or in some embodiments, by opening a hinged door and inserting the one or more cables and/or hoses.

A coupling mechanism such as one or more triggers, levers, or other controls may be provided to allow a user to clamp the one or more cables and/or hoses inside the cable handling device allowing the cables/hoses to be deployed or retracted from a pipe or cavity together. Once the user has reached the desired location in the pipe or cavity, which can be determined by viewing images provided by the camera, using a location device such as a GPS coupled to the camera, measuring the distance length of the one or more cables and/or hoses deployed, or using other location determining devices or methods understood by those skilled in the art, the user can then release the one or more triggers or controls to allow one or more of the cables and/or hoses to move independently from the cable handling device and/or the other of the one or more cables and/or hoses. This allows a user to deploy the one or more cables and/or hoses at different locations inside the pipe and/or cavity.

In one embodiment, a user inserts a cable attached to a camera and a flex-shaft attached to a cutting mechanism into the cable handling device. The user then deploys the two cables simultaneously into a pipe or cavity by using a trigger to couple the two cables and then using their hands attached to the cable handling device and pushing the device and thus the cables into the pipe. The cable handling device may also be configured to automatically deploy one or more cables and/or hoses when the trigger is activated using a motorized feeding element which may include wheels. The user may desire to have one of the cables deployed ahead of the other and, therefore, insert the cables into the cable handling device in the desired configuration. For instance, the user may want the camera to be ahead of the cutting device and may insert the cables into the cable handling device in such a way as to achieve the desired configuration. In this manner, the user can view the camera images without the cutting device obstructing the user's view. If more of the cables needs to be deployed, the user release the trigger and pulls the cable handling device back independent of the two cables. The user can repeat the sequence until the desired location inside the pipe has been reached. Once the two cables are deployed, the user may desire to pull the camera back and push the cutting device forward to allow an obstruction to be removed by the cutting device while protecting the camera cable and camera from being damaged by the cutting device. By releasing the one or more triggers, the user can move the cables independently from each other and from the cable handling device. The user may then continue the process by reconfiguring the cables inside the cable handling device as desired, and further deploying the cables into the pipe by using the trigger to inspect other locations in the pipe. When the user is done with the cables/tools inside the pipe, the trigger is activated to clamp the cables and the user manually pulls back on the cable handling device thus pulling the cables back with it. Then the trigger is released allowing the device to be pushed forward independent of the cables so that the trigger can be used again to clamp the cables and the user can continue to retract the cables as desired.

In some embodiments the device may have an automatic feeder direction control allowing the cable to be retracted.

In some embodiments, dampening or noise cancellation could be provided to reduce noise and vibration when the flex-shaft is transmitting power to a cutting mechanism in order to provide better imaging by reducing possible distortions created by the camera being near the flex-shaft.

In some embodiments, coupling mechanism may be a trigger or other control and may include other controls such as speed control, control lock, direction control, etc. A trigger may be provided to control one or multiple cables, or multiple triggers may be provided to control one or more cables individually.

In another embodiment, the cable handling device deploys or retracts one or more cables and/or hoses by attaching various clips, clamps, and pipe guides along desired locations of the one or more cables and/or hoses to provide, among other things, cable management, cable steering and/or cable protection. As an example, a pipe guide may have an opening through the center allowing the camera cable and cable to be inserted snugly into the opening. Another cable or hose, for example a flex-shaft with a cutting mechanism attached, can be inserted into one of the outside channels. The pipe guide can be attached at the desired location along the cables, or along the camera assembly, depending on the size of pipe guide used. Cable clips and clamps simply clamp one or more cables together, typically by twisting or with a provided tightening mechanism. It is often desirable to locate the clamp or pipe guide near or on the camera assembly to allow the camera and any other attached cables or hoses to be easily pushed and guided into a pipe or cavity. Guides have the added advantage over clips or clamps because they are often designed to permit axial movement while restraining both lateral and angular movement.

In another embodiment, a cutting mechanism, as an example, a chain knocker is provided a the end of a flex-shaft. The flex-shaft attaches using a pair of set screws that bite on the flexible shaft. The chain mount may have a shaft collar that is a larger diameter than the sheathing on the flexible shaft.

In another embodiment, the plastic material forming the pipe guide could be shaped and formed in such a way that it creates a flexure, so that the flex-shaft sheath can be "snapped in," but the chain mount would still crash on an undersized bore. This would allow the flex-shaft to be attached without removing the chain if the chain knocker.

In some embodiments, multiple bores could be added to allow two or more flex-shafts to be used. Alternatively, the bores could be of a different size and include a lip configured to accept an installed captive sleeve to provided adaptation to various sizes of sheathing, hose, etc. Cleaning could be provided as well, by implementing a capture O-ring in the supplemental bore, to wipe the flex-shaft sheathing pulled back into the O-ring.

In another embodiment, the disclosure relates to a configuration wherein the cable handling device works in conjunction with remotely controlled clamps dispersed along desired locations of the one or more cables and/or hoses to provide, among other things, cable management, cable steering and/or cable protection.

In another embodiment, a camera and a flex cable with a chain knocker attached at the end may be clamped together with a remote controlled clamp being placed behind the camera assembly as shown in FIG. 13A. The chain knocker could be positioned behind the camera assembly so that when the camera is moved forward or backwards in a pipe or cavity, the flex-shaft and chain knocker would be moved as well. Once a desired location is reached, LEDs located in the camera head could be modulated to send an optical signal to a receiving sensor located in the clamp, to unclamp the flex-shaft allowing it to be move independent of the camera. The flex-shaft and chain knocker could then be moved forward to allow the flex-shaft to be powered and the chain knocker to rotate to clear any obstructions without damaging the camera which is now behind the chain knocker. The clamp could then be sent another optical signal to again clamp the flex-shaft to the camera cable so the flex-shaft and chain knocker could again be deployed or retracted as desired.

In another embodiment, the remote controlled clamp could be located on or near the camera head as shown in FIG. 13B. The diameter of the distal side of the clamp could be smaller than the diameter of the chain proximal side end cap, thereby preventing the chain knocker from ever being pulled near the camera cable, thus preventing damage to the camera cable from the chain knocker.

In another embodiment, as an alternative to optically controlling the remote controlled clamp, a transmitter/transceiver could be provided on or near the camera head as shown in FIG. 13C. The transmitter/transceiver could be configured to send control signals to a receiving sensor in the clamp. The transmitted signals could be wireless, electromagnetic, radio, Bluetooth, BLE (Bluetooth Low Energy), etc. Various frequency schemes could be provided, included but not limited to, 400 Hz, 512 Hz, 32 kHz.

In another embodiment, the transmitted signal to control the remote clamp could be provided by an electromagnetic Sonde or other type of location Sonde or beacon. Alternatively, the remote controlled clamp could be integrated with a three-axis magnetometer capable of communicating with a second sensor located with the camera, wherein the second sensor is configured to modulate an electromagnetic signal that can be received by the three-axis magnetometer and used to control the opening and closing of the remote controlled clamp.

It is noted that as used herein, the term "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

FIG. 1 (Prior Art) is an example of a typical system 100 which may be used for deploying or retracting one or more cables and/or hoses 110 into a pipe or cavity 120, manually by user 130 by hand 140. The one or more of the cables and/or hoses 110 may be a cable 110 attached to a camera assembly 150, and one or more of the cables and/or hoses 110 may be a flex-shaft 110 for providing power to a cutting tool 160, which may be used to clear an obstruction 170 in the pipe or cavity 120. Optionally, one or more of the cables and/or hoses 110 may be a hose 110 which provides pressurized water or other fluid through a nozzle or jetter (not shown). The cutting tool 160 and/or pressurized water or other fluid forced through the nozzle or jetter (not shown) may be used to clear an obstruction 170 in the pipe or cavity 120. Optionally, one or more cables and/or hoses may be deployed from and stored on drum-reels 180.

Figure 2:
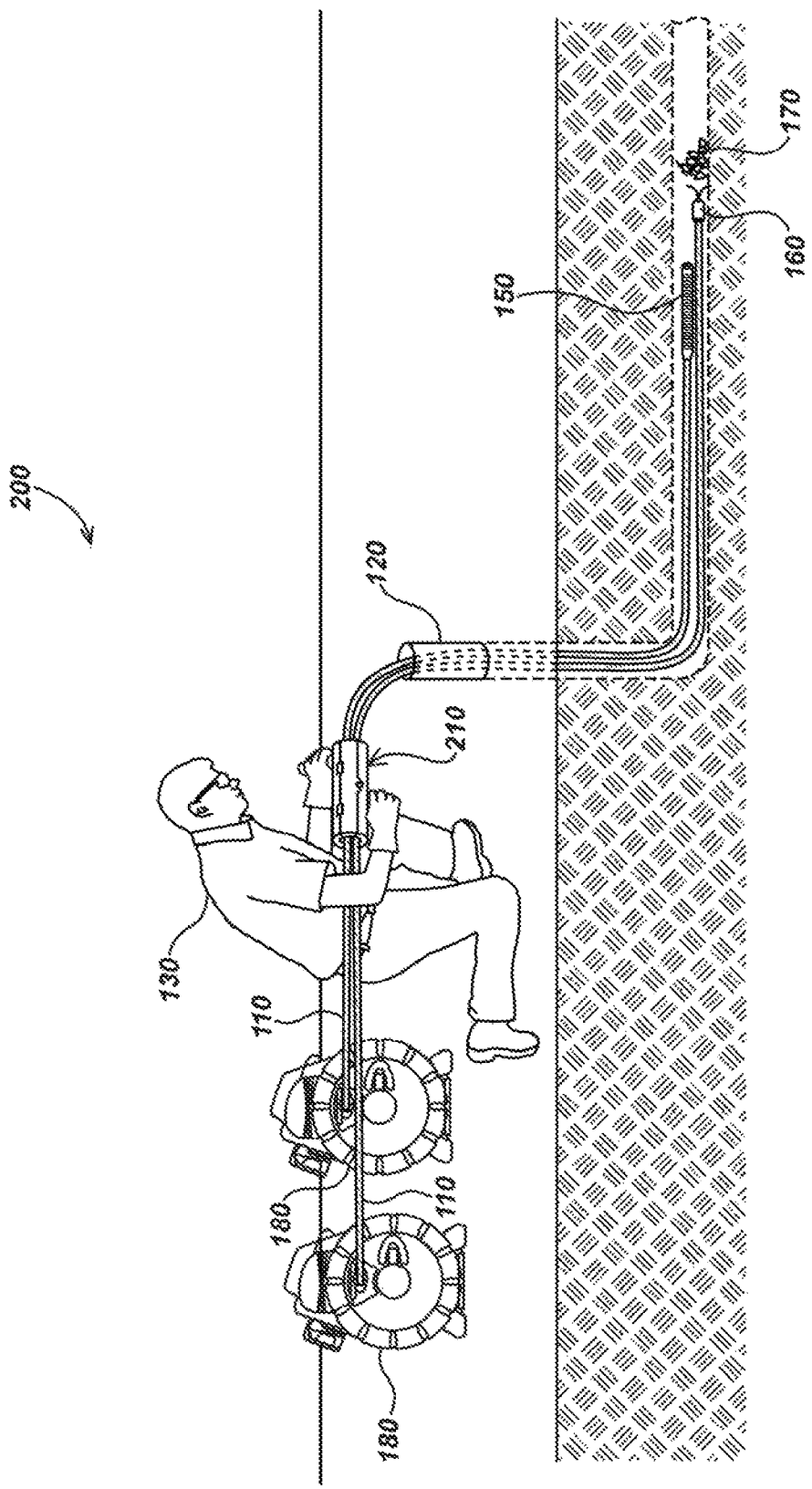
FIG. 2 is an illustration of an exemplary embodiment of an inspection and obstruction cleaning system including a cable handling device in accordance with certain aspects of the invention.

FIG. 2 illustrates details of an exemplary embodiment of an inspection and obstruction cleaning system 200 including a cable handling device 210 being held by a user 130 and being used to deploy or retract two cables 110 into a pipe or cavity 120 allowing the pipe or cavity 120 to be inspected and cleaned as necessary. One or more of the cables and/or hoses 110 may be a push-cable including a camera assembly 150 and one or more of the cables and/or hoses 110 may be a flex-shaft for providing power to a cutting tool 160, which may be used to clear an obstruction 170 in the pipe or cavity 120. The camera assembly 150 may include a flexible guide spring attached to an imaging device which may include additional sensors, electronics, and/or memory. Optionally, one or more of the cables and/or hoses 110 may be a hose which provides pressurized water or other fluid through a nozzle or jetter (not shown). The cutting tool 160 and/or pressurized water or other fluid forced through the nozzle or jetter (not shown) may be used to clear an obstruction 170 in the cavity or pipe 120. Optionally, one or more cables and/or hoses may be deployed from and stored on drum-reels 180.

Figure 3A:
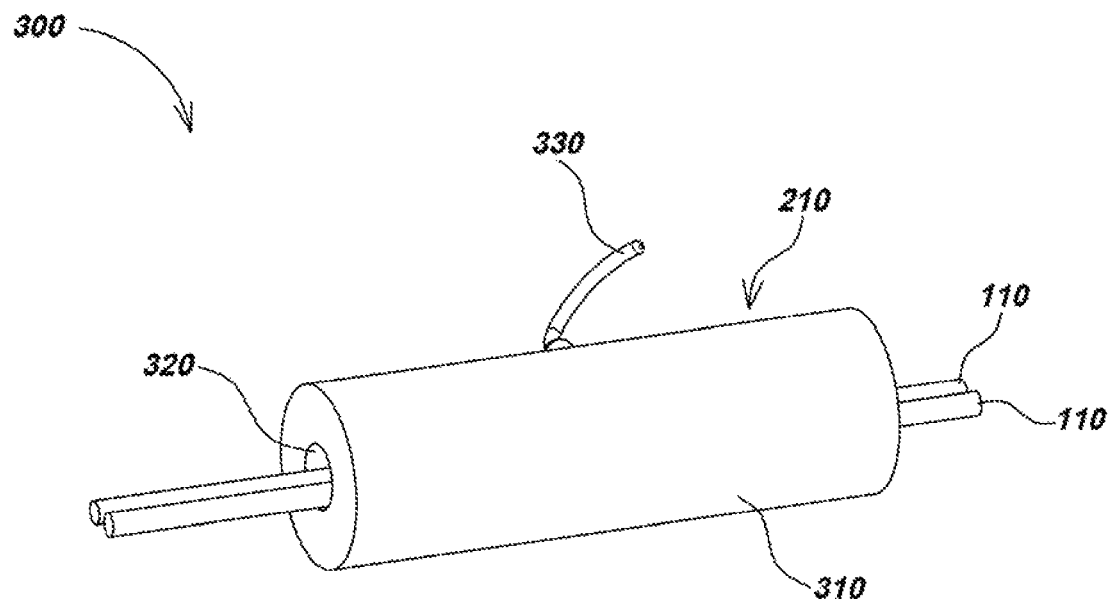
FIG. 3A is an illustration of an embodiment of a cable handling device that does not have a door in accordance with certain aspects of the invention.

FIG. 3A illustrates details of an exemplary embodiment 300 of a cable handling device 210 which has a housing 310 and a channel 320 through openings at opposite ends of the housing 310. The openings allow one or more cables or hoses 110 to be inserted through the channel 320 from one end to the other so that the one or more cables or hoses 110 may be coupled to the cable handling device 210. A coupling control 330 may be provided to activate an internal coupling mechanism (not shown) inside the cable handling device 210.

Figure 3B:
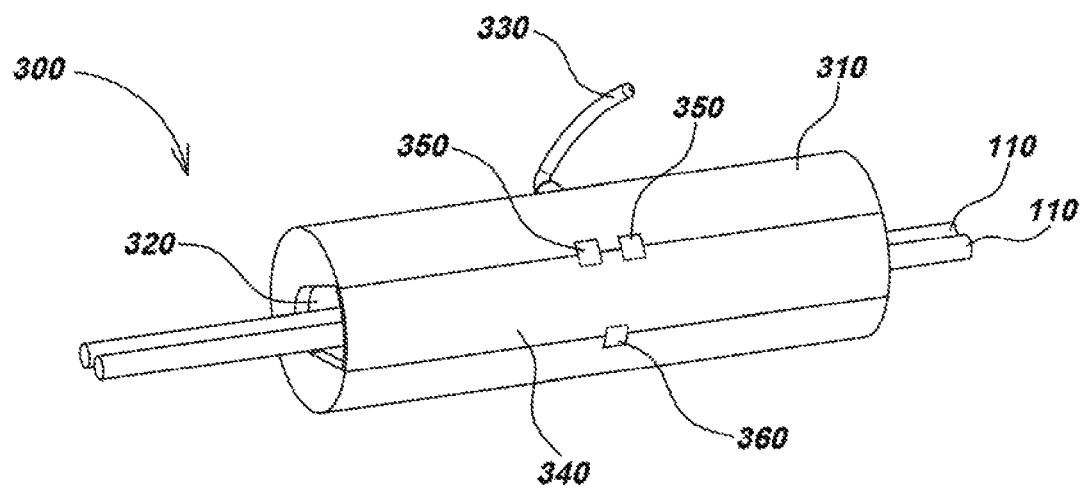
FIG. 3B is an illustration of an embodiment of a cable handling device that has a hinged door in accordance with certain aspects of the invention.

FIG. 3B illustrates details of an exemplary embodiment 300 of a cable handling device 210 which includes a door 340 which may include at least one hinge 350 and a latching mechanism 360. Door 340 may be opened allowing one or more cables or hoses 110 to be inserted into channel 320 and then secured by closing door 340 and then securing the door 340 with latching mechanism 360. The one or more cables or hoses 110 may be coupled to the cable handling device 210 by using a coupling control 330 to activate an internal coupling mechanism (not shown) inside the cable handling device 210. The door 340 may be made of a material that is non-transparent or transparent, or may include one or more windows, thus allowing a user to see the sections of the one or more cables and/or hoses 110 inside the cable handling device 210 when the door 340 is closed.

Figure 4A:
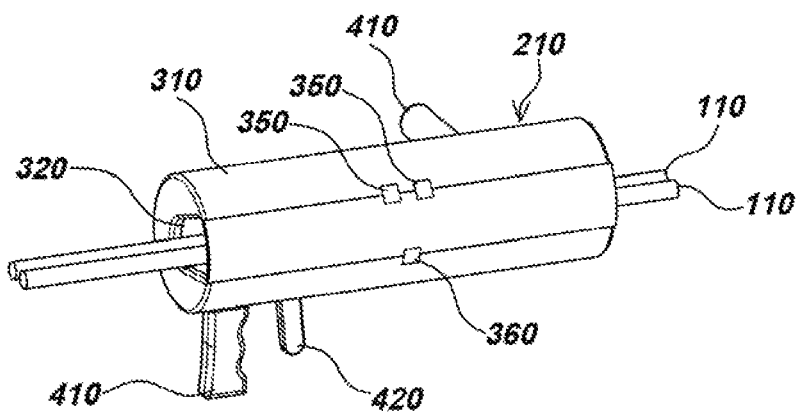
FIGS. 4A and 4B are illustrations of embodiments of a cable handling device that have a handle and at least one trigger in accordance with certain aspects of the invention.

FIG. 4A illustrates details of an exemplary embodiment 400 of a cable handling device 210 with handles 410 and a coupling control in the form of a single trigger 420. The trigger 420 allows a user to actuate movements of at least one cable and/or hose in a forward or backward direction by using the trigger 420. Trigger 420 may be used as coupling control 330 to activate an internal coupling mechanism (not shown) inside the cable handling device 210 to engage one or more cables and/or hoses placed in the cable handling device 210, thus facilitating deployment or retraction of at least one cable or hose into or out of a pipe or cavity by applying a manual or automatic force in the desired direction, i.e. deployment or retraction. When trigger 420 is released, it allows cable handling device 210 to move independently of the one or more cables and/or hoses. Trigger 420 may also include integrated speed and/or direction control to control the speed and/or direction of deployment or retraction of the one or more cables and/or hoses. Optionally, speed and/or direction control may be separate controls not associated with the trigger 420. Additionally, one or more triggers 420 may include a locking mechanism to allow one or more triggers 420 to be locked in an on or off position or any position in between.

Figure 4B:
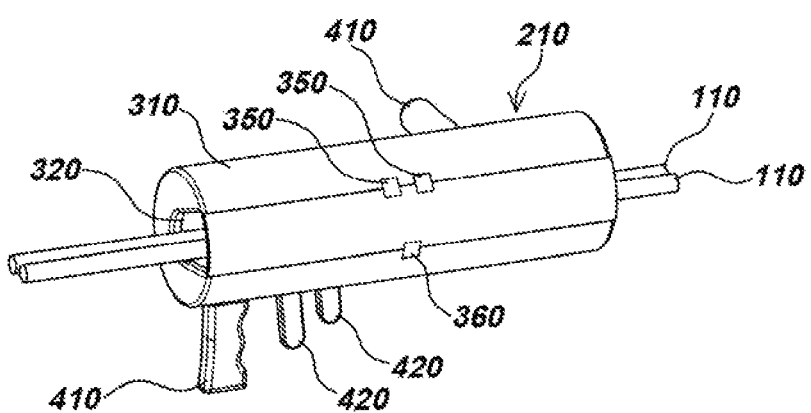

FIG. 4B illustrates details of an exemplary embodiment 400 of a cable handling device 210, with coupling controls in the form of a two triggers 420 (piggy backed) one in front of the other as shown, or in another configuration, e.g. side by side, etc.

Figure 5A:
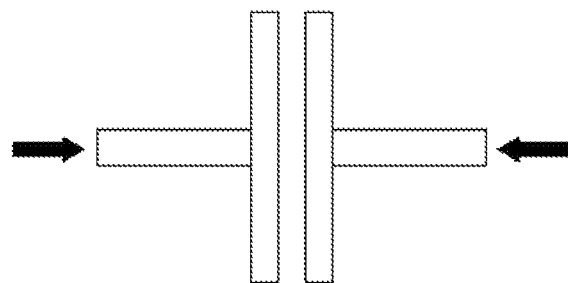
FIGS. 5A, 5B and 5C are illustrations of embodiments of a clutching mechanism, as known in the prior art.
Figure 5B:
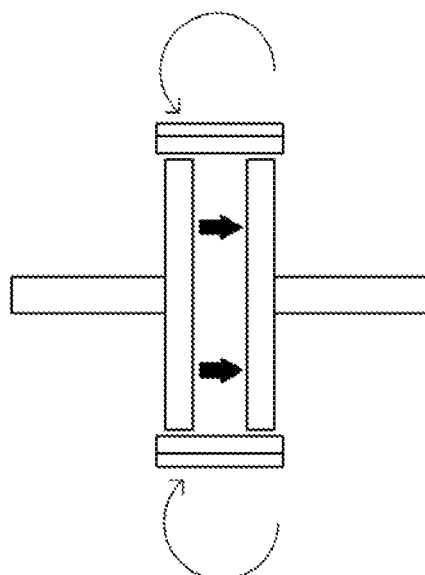
Figure 5C:
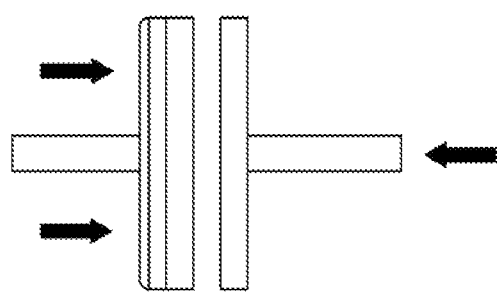

FIGS. 5A, 5B and 5C are some examples of clutch mechanisms that are well known in the art. FIGS. 5A, 5B and 5C represent a mechanical clutch, a magnetically controlled clutch and a disk type clutch, respectively. It would be understood by those of ordinary skill in the art that some embodiments could use a single clutch or multiple clutches to clamp one or more cables or hoses, and that the clutching mechanism could be various other well known clutching or clamping mechanisms and could be in many different configurations.

Clutches are well known in the art, and may include, by limited example only, friction type clutches with single or multiple plates, centrifugal clutches or flywheel type clutches. Clutch forces may be applied to one or more plates causing the plates to apply pressure against another surface or plate and used to secure one or more cables and/or hoses. The clutch force applied could be electromagnetic, pneumatic, manual pressure, or any other clutch type forces known in the prior art. The clutch could be completely released to allow the one or more cables and/or hoses to move freely, or could have a reduced force applied, thereby allowing the one or more cables and/or clutches to move by slipping a desired amount. The embodiments herein could be implemented with a single clutch or multiple clutches. The single or multiple clutches could be used to control (couple) a single cable and/or hose or multiple cables and/or hoses. The single or multiple clutches could be controlled by a single coupling control and/or multiple coupling controllers.

Figure 6:
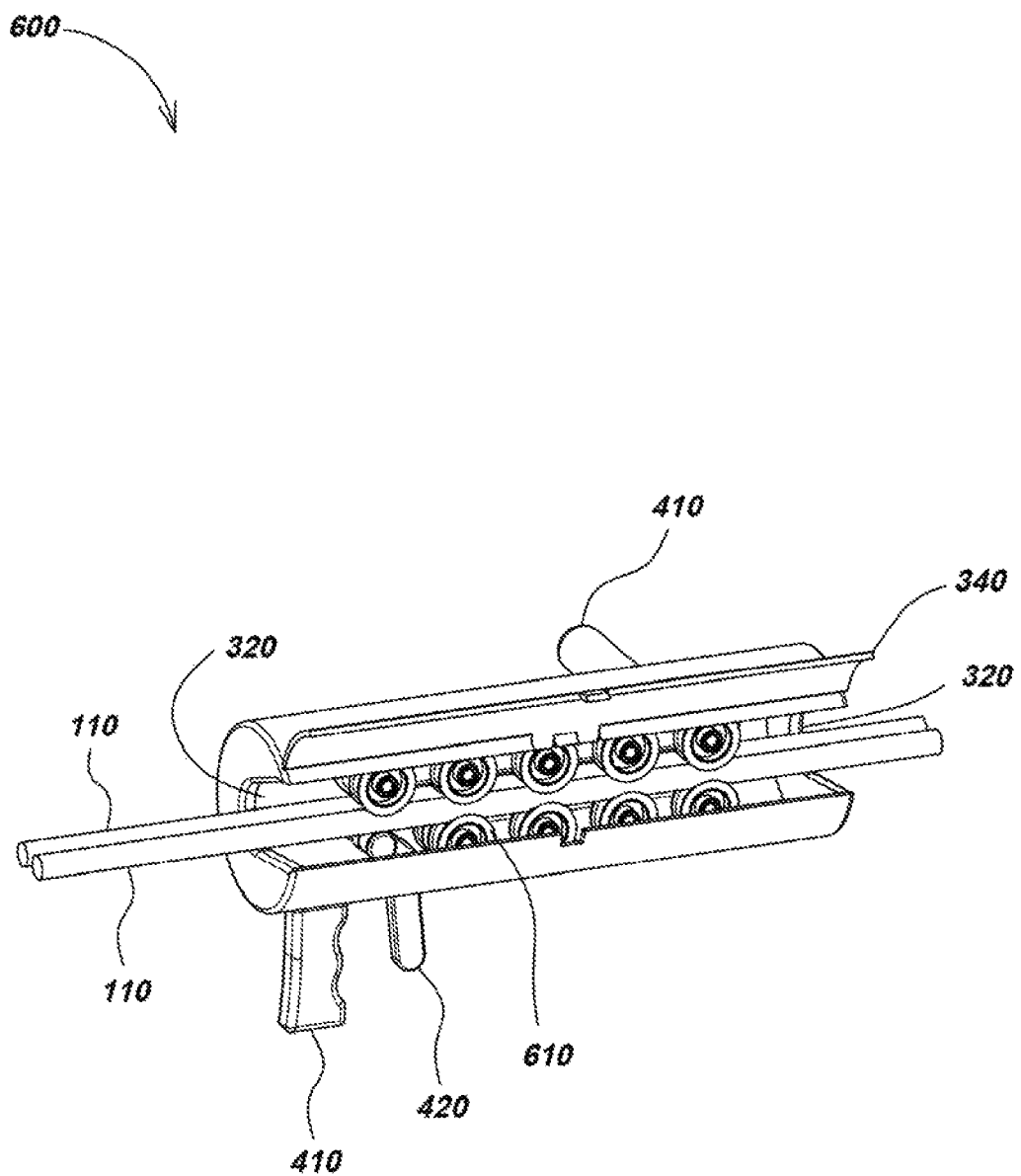
FIG. 6 is an illustration of an embodiment of a cable handling device with the door open allowing cables or hoses to be inserted and secured, or removed in accordance with certain aspects of the present invention.

FIG. 6 illustrates details of an exemplary embodiment 600 of a cable handling device with door 340 open to show a view of a wheels 610 which are controlled by an internal coupling mechanism (not shown) via a coupling control trigger 420. When trigger 420 is activated it causes the wheels 610 to engage with at least one cable and/or hose 110 and locks the wheels 610 so they can not rotate thereby allowing a user to apply force to the handles 410 of the cable handling device 600 so that the at least one cable and/or hose can be deployed or retracted into or out of a pipe or cavity. When the trigger 420 is released it allows the one or more cables and/or hoses to move freely by disengaging the internal coupling mechanism (not shown) thereby allowing the wheels to rotate freely and the allowing the cable handling device 210 to move independently of the at least one cable and/or hose.

Figure 7:
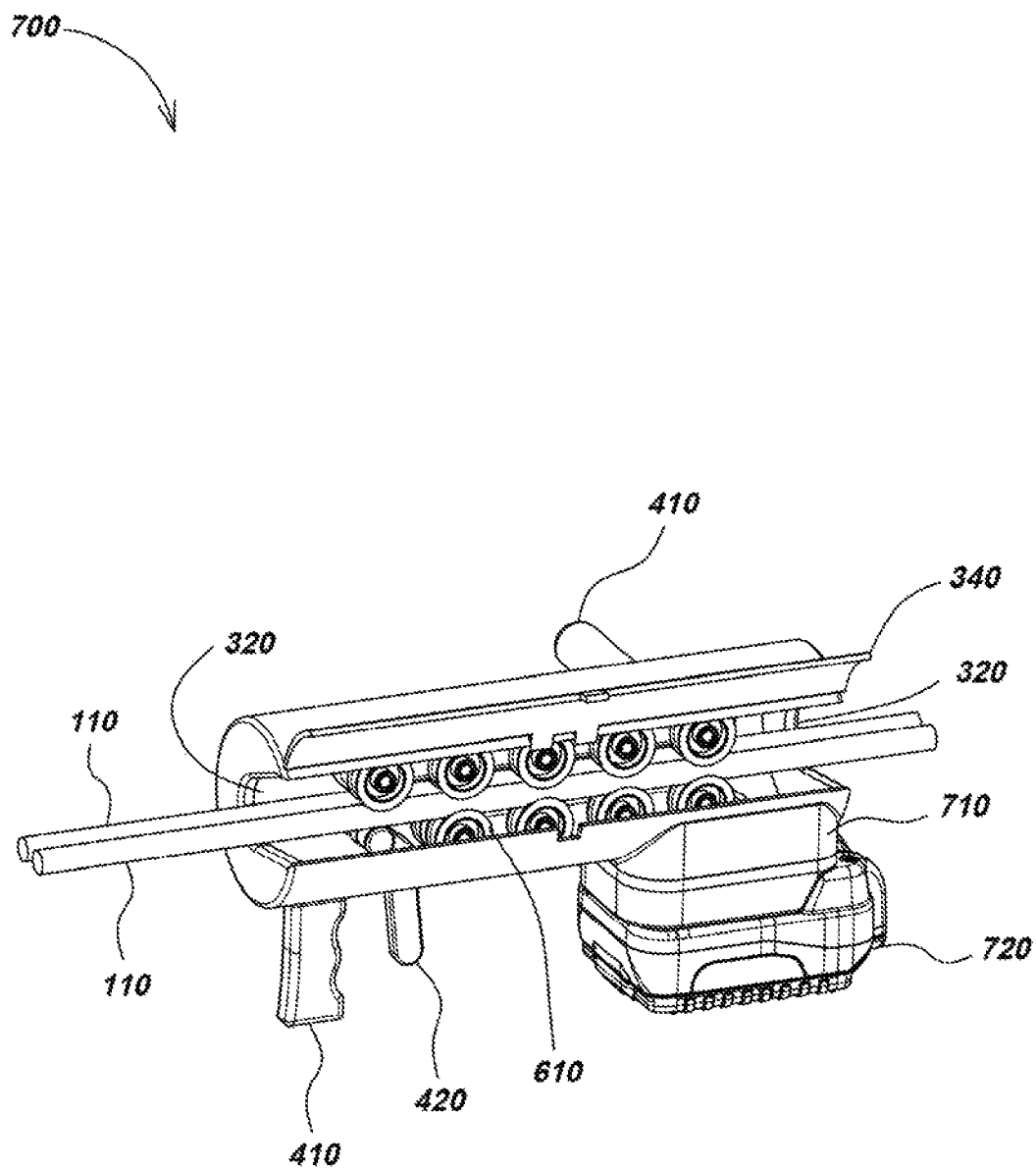
FIG. 7 is an illustration of an embodiment of a cable handling device with an automatic motorized wheel feeder powered by an external battery in accordance with certain aspects of the present invention.

FIG. 7 illustrates details of an exemplary embodiment 700 of a cable handling device 210 that includes a motorized feeder. Cable handling device 700 may include a motor 710 for rotating one or more wheels 610 to provide automatic feeding of one or more cables and/hoses for deployment or retraction into or out of a pipe or cavity. The motor 710 may be powered by a battery 720 which may be rechargeable and/or detachable, or another power supply. The trigger 420 is used to turn the motor 710 and thus the wheels 610 on or off. Trigger 420 may also provide speed control and/or directional control to the motorized wheels for deployment or retraction into or out of a pipe or cavity.

Figure 8A:
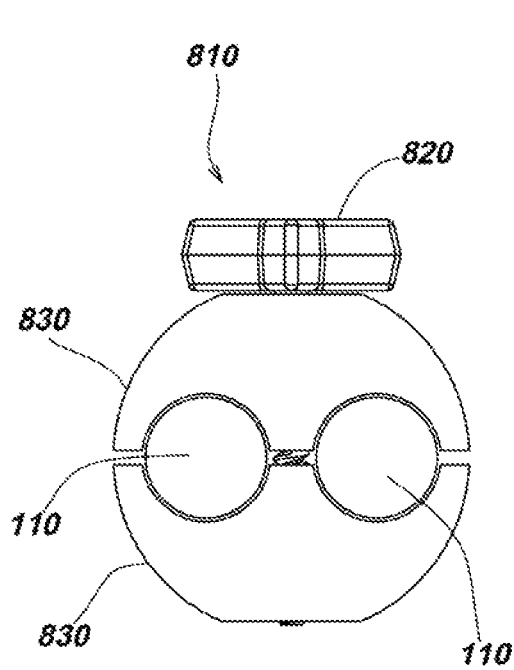
FIGS. 8A, 8B, 8C and 8D are illustrations of embodiments of various cable clips or guides as known in the prior art.
Figure 8B:
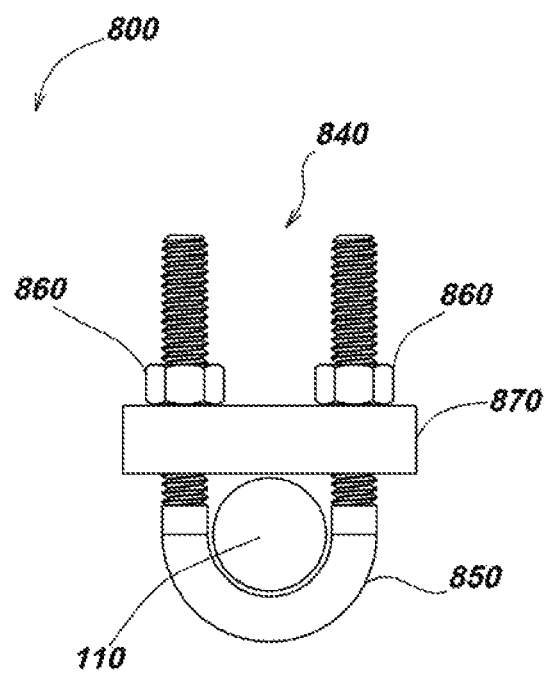

FIGS. 8A, 8B, 8C, 8D, 8E and 8F illustrate details of exemplary embodiments 800 of cable/hose clips and pipe guides as known in the prior art. FIG. 8A shows a screw type clamp 810 with a hand screw 820 which when tightened closes clamps 830 which secure cables/hoses 110. FIG. 8B shows a U-bolt type clamp 840 with a two ended threaded U-bolt 850. When nuts 860 are tightened against the top side of bar 870, it causes the bottom side of the bar 870 to tighten against one or more cables/hoses 110, thereby securing them. In some exemplary embodiments, the cable clamps may be powered by one or more batteries (not shown).

Figure 8C:
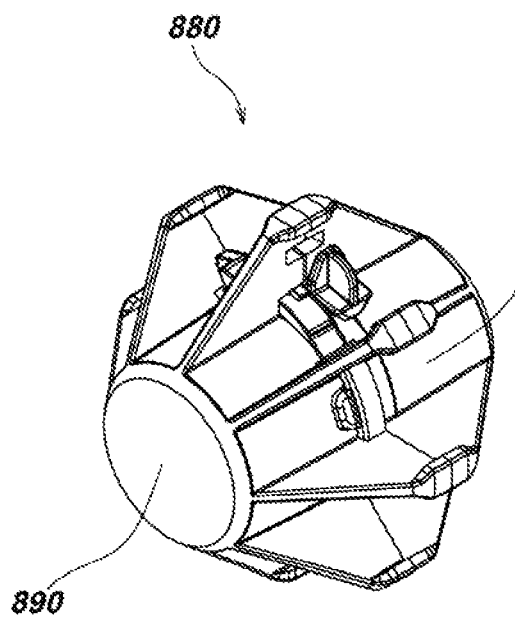
Figure 8D:
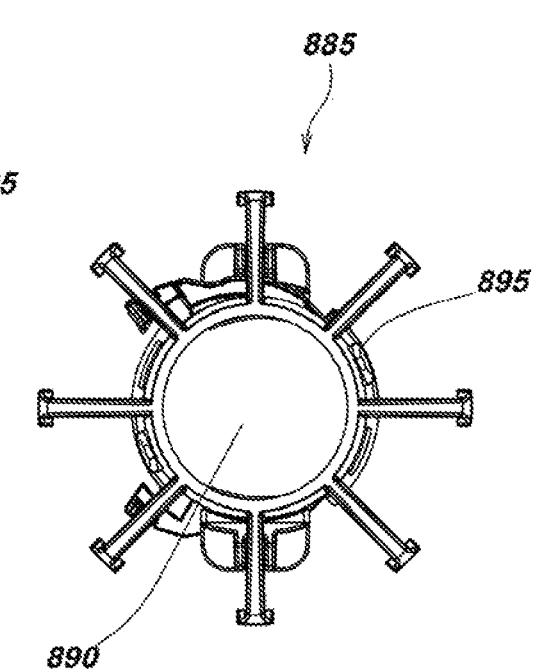

FIGS. 8C and 8D illustrate details of exemplary embodiments of cable/hose guides 880 and 885 which have similar but different shapes and features as known in the prior art. A first cable/hose 110 is threaded and secured through a center channel 890 of the guides 880 and 885, and additional cables/hoses are guided along one or more channels 895.

Figure 9C:
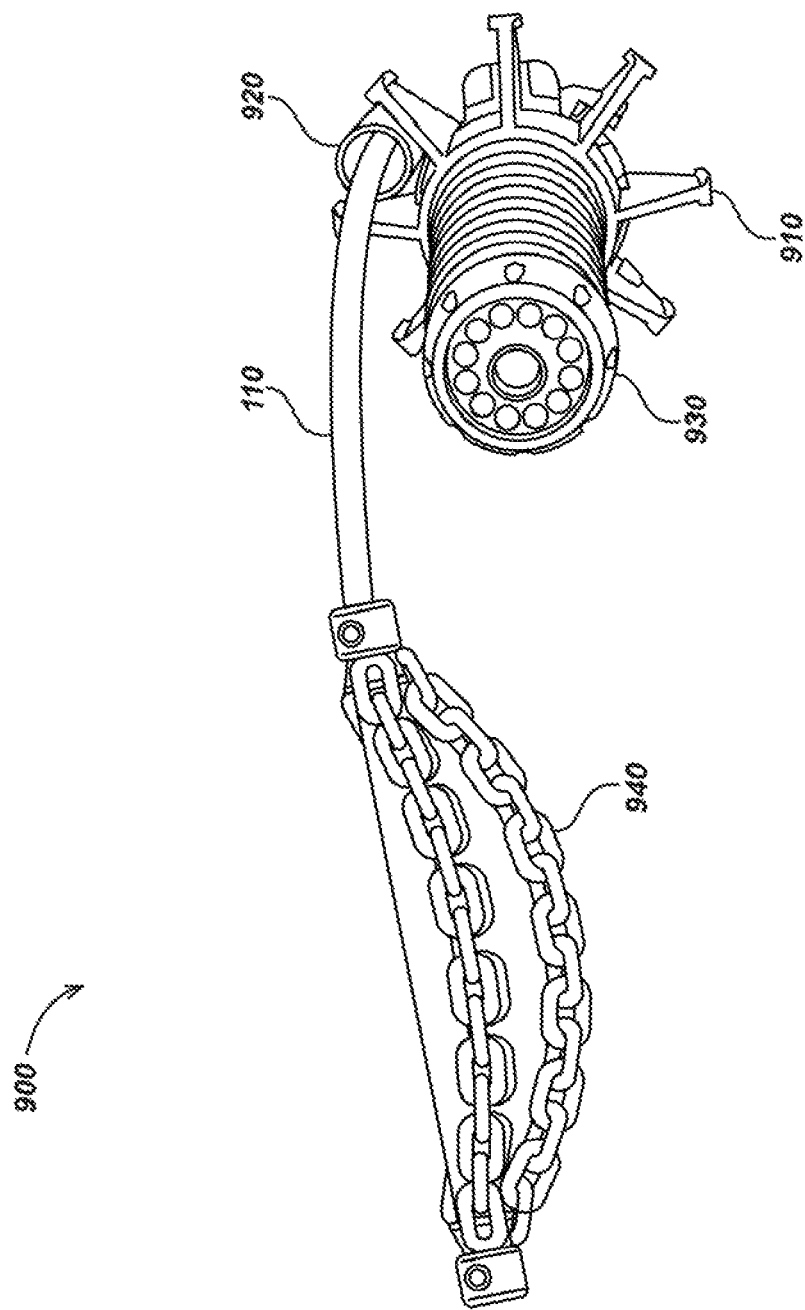

FIGS. 9A, 9B and 9C illustrate details of an exemplary embodiment 900 of a pipe guide 910 integrated with a cable/hose stop 920. In this example, cable 110 is a push-cable which is used to push or pull a camera head 930 into or out of a pipe or cavity during deployment or retraction of the camera head 930. As the camera head 930 is being pushed into a pipe or cavity via the push cable 110, another cable 110 which in this example is a flex-shaft being used to supply rotational power to a chain knocker 940 is also pushed into the pipe or cavity. Push cable 110 which is attached to the camera via a spring. The spring fits snuggly into cable guide 910 which is attached to cable stop 920. As cable guide 910 is moved forward the stationary cable stop 920 pushes again the proximal end of the chain knocker causing the flex-shaft 110 and the chain knocker 940 to be moved the same distance and at the same speed as the push cable, thereby allowing the push cable to deploy the chain knocker 940. In this type of deployment no power should be supplied to the chain knocker 940. As the push-cable is being pushed, the guide-stop prevents the chain knocker 940 from moving backwards towards the camera 930. A typical chain knocker 940 may include a pair of set screws which when tightened allow the chain end-caps to be secured against the flexshaft 110, thereby allowing the chain knocker 940 to remain in place.

FIG. 9B shows the chain knocker 940 ready to cut/clear a pipe or cavity blockage. The chain knocker 940 is in a open position caused by power being supplied to the flex-shaft 110. At this time the flex-shaft 110 and the chain knocker 940 can be moved freely forward ahead of the camera 930, thereby, preventing damage to the camera 930 while power is being supplied to the chain knocker 940 in order to facilitate cutting of a blockage (e.g. tree roots, debris, etc.).

FIG. 9C shows a different view of a pipe guide 910 integrated with a cable/hose stop 920 using a slightly different shaped pipe guide 910. In some exemplary embodiments, cable/hose stop 920 may be removable attached to pipe guide 910 via a clamp or other mechanism. The pipe guide may be designed to fit snuggly around a specific diameter cable/hose 110, or shim tubes with collars may be inserted between the cable/hose 100 and the pipe guide to achieve the desired fit.

Figure 9D:
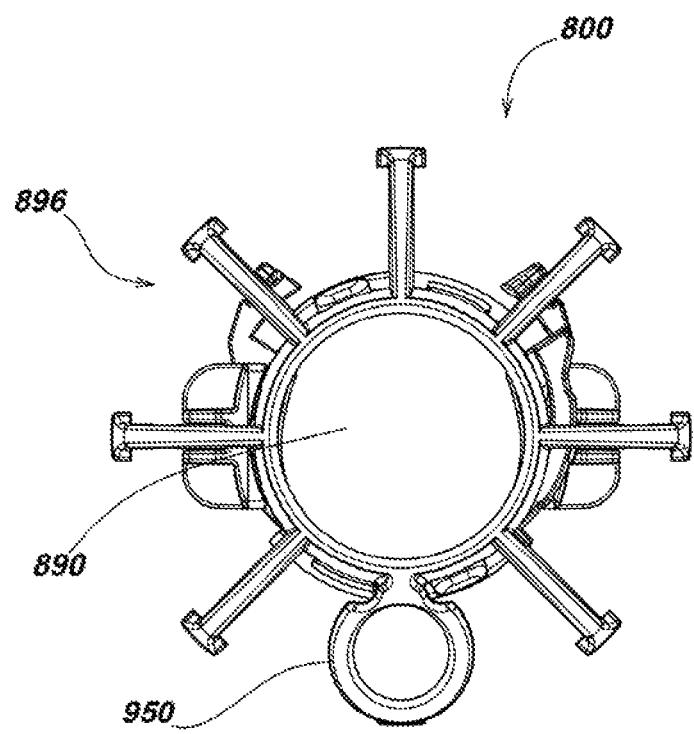
Figure 9E:
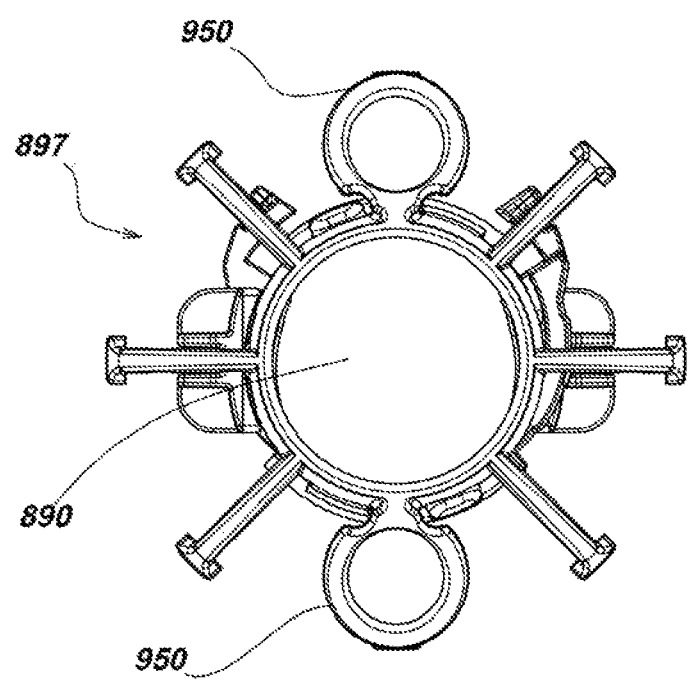

FIGS. 9D and 9E illustrate details of exemplary embodiments 800 of pipe guides 896 and 897 which may include one or more closed guides 950 dispersed among the guide channels 895 and used as a guide-stop to prevent a chain knocker 940 (not shown) from moving backwards towards the camera 930 (not shown).

Figure 10:
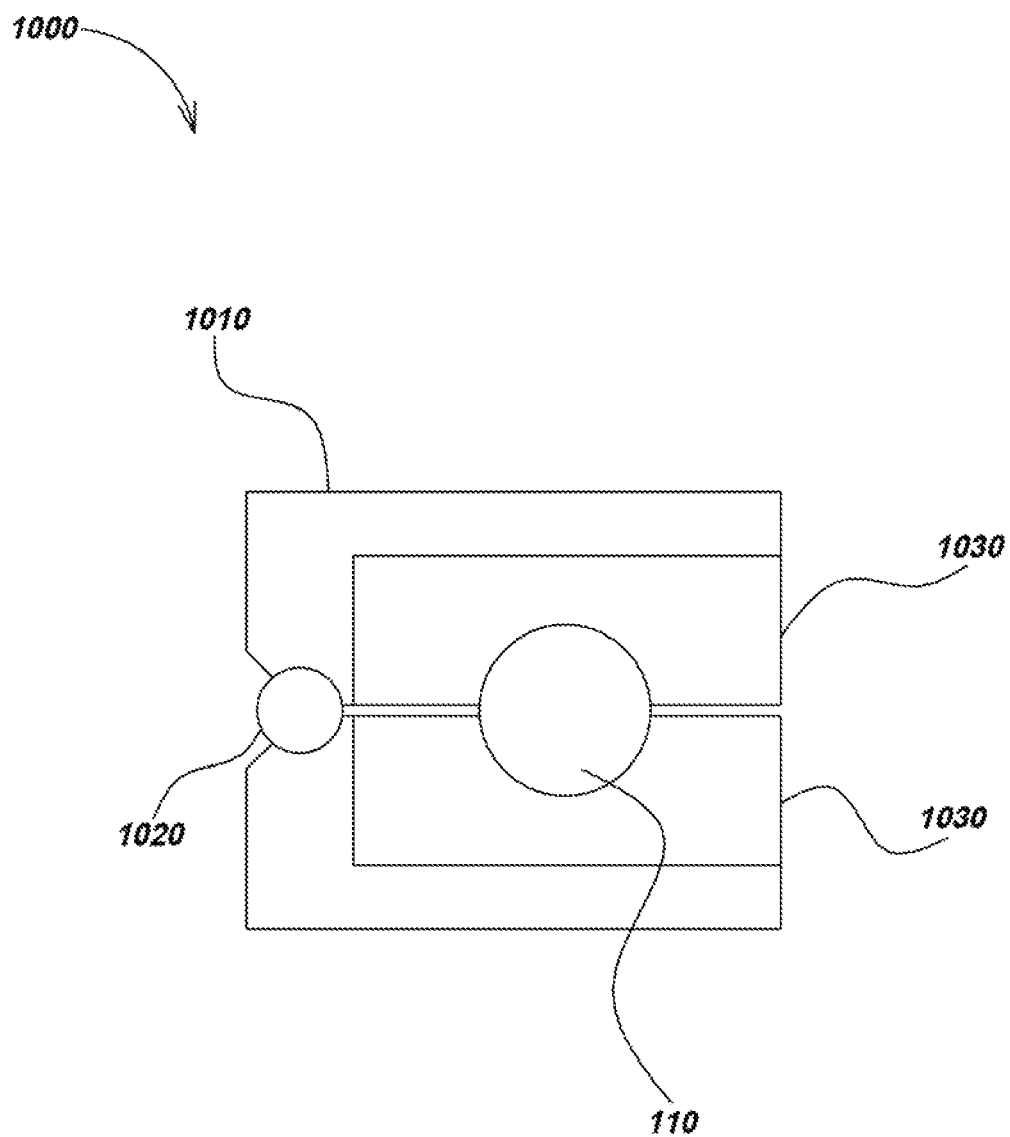
FIG. 10 is a cross-section illustration of an embodiment of an integrated cable\hose cleaner.

FIG. 10 illustrates details of an exemplary embodiment 1000 of a cable/hose cleaner. A clamp 1010 with and adjustable tightening screw 1020 can be tightened causing cleaning elements (e.g. sponges, cloth, etc.) 1030 to come in contact with one or more cables/hoses 110 which will be wiped off as they are drawn through the cleaning elements 1030.

Figure 11:
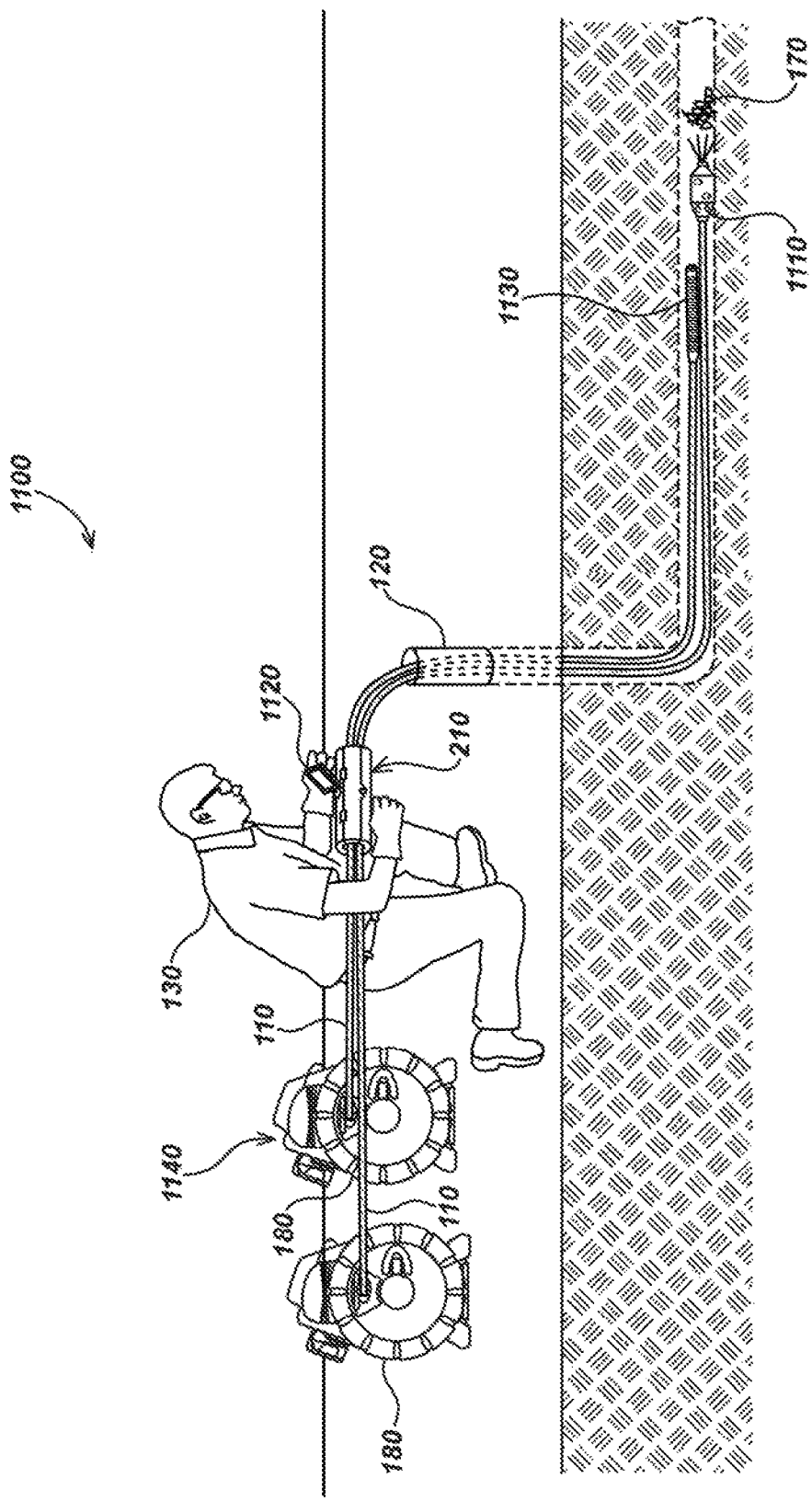
FIG. 11 is an illustration of an embodiment with a cable handling device used with a camera and a jetter in accordance with certain aspects of the present invention.

FIG. 11 illustrates details of an exemplary embodiment 1100 of a cable handling device 210 being held by a user 130 and being used to deploy or retract two cables 110 into a pipe or cavity 120 allowing the pipe or cavity 120 to be inspected and cleaned as necessary. One or more of the cables and/or hoses 110 may be a camera assembly 150 and one or more of the cables and/or hoses 110 may be a hose for providing pressurized water or other fluid through a nozzle or jetter 1100. The pressurized water or other fluid forced through the nozzle or jetter 1100 may be used to clear an obstruction 170 in the cavity or pipe 110. Optionally, one or more cables and/or hoses may be deployed from and stored on drum-reels 180.

In one exemplary embodiment, video images and/or data may be shown on a display 1120 with an integrated radio transceiver (not shown) that may receive image data wirelessly from a transceiver 1130 integrated with the camera assembly 150 and/or a transceiver 1140 integrated with an optional drum-reel 180. This provides a user 130 with visual information from the camera assembly 150 that can be used to steer the camera assembly 150 and/or the nozzle or jetter 1110 to aid in locating an obstruction 170 and removing it with pressurized water or fluid from the nozzle or jetter 1110. In some embodiments, the obstruction 170 may be removed using a cutting tool powered by an electrical cable 110 or a flex-shaft 110.

Figure 12B:
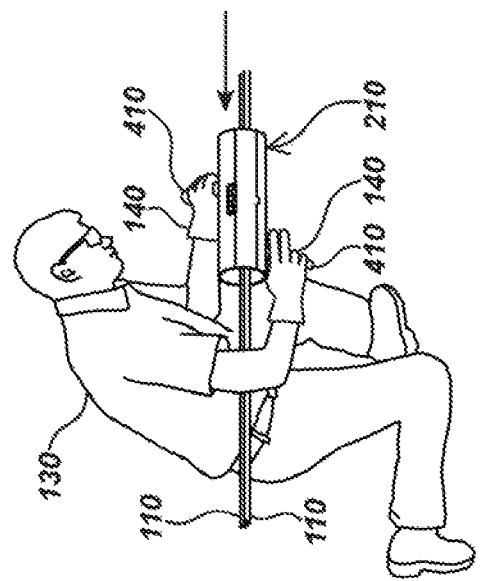
FIGS. 12A and 12B are illustrations of embodiments of a cable handling device being used to deploy or retract a cable or hose into a pipe or cavity manually.
Figure 12A:
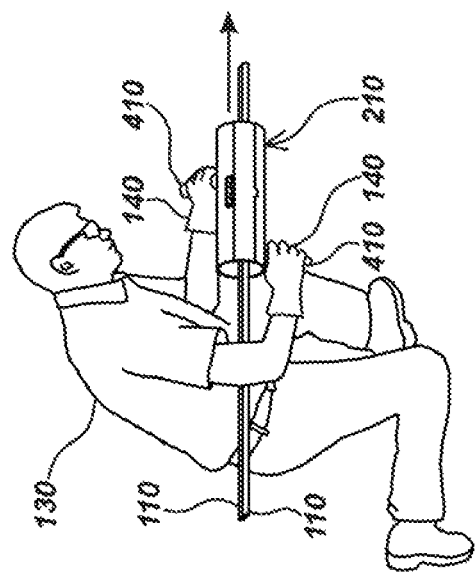

FIGS. 12A and 12B are illustrations of embodiments 1200 of a cable handling device 210 being used to deploy a cable or hose into a pipe or cavity (not shown) manually. In FIG. 12A a user 130 grabs the handles 410 with their hands 140, exerts pressure on the trigger (not shown) which activates an internal coupling mechanism (not shown) inside the cable handling device 210. The user 130 then uses the handles 410 to push the one or more cables and/or hoses 110 into a pipe or cavity (not shown). Since the coupling mechanism is engaged via the trigger, as the user 130 exerts force on the handles in a forward direction away from their body as shown by the arrow, the one or more cables and/or hoses move in the same direction. As shown in FIG. 4B, once the user 130 has pushed the one or more cable/and/or hose forward, they can then release the trigger which releases the coupling mechanism from the one or more cables and/or hoses, thereby allowing the cable handling device 210 to be pulled back towards the user 130 without affecting the position of the one or more cables and/or hoses 110. A user can then repeat the process to deploy the desired amount of the one or more cables and/or hoses into the pipe or cavity.

The one or more cables and/or/hoses 110 may be retracted from the pipe or cavity by exerting pressure on the trigger and pulling the one or more cables and/or hoses out of the pipe or cavity. The trigger can be released to allow the cable handling device 210 to be pushed forward independent of the one or more cables and/or hoses and then the trigger can again be activated to repeat the process until the desired amount of the one or more cables and/or hoses has been retracted from the pipe or cavity.

FIG. 13A illustrates details of an exemplary embodiment 1300 using a remote controlled clamp 1310 and 1320 to provide clamping of a camera cable 110 attached at the distal end to a camera assembly 150 and/or to a flex-shaft 110 connected to a chain knocker 940. Clamp 1310 which includes an optical sensor is attached securely to the camera cable 110 in a position behind the camera assembly 150. The camera includes LED's which can be modulated to transmit a signal which can be received by the sensor in clamp 1310. Clamp 1310 is communicably coupled to clamp 1320. The modulated signal from the LEDs can be received by the sensor in clamp 1310 and used to control the opening and closing of clamp 1320.

FIG. 13B illustrates details of an exemplary embodiment which includes a steering stick 1330 to help steer the camera assembly 1310 into a desired position. In FIG. 13B clamp 1310 is located proximal to the camera assembly 150. Clamp 1320 is a smaller diameter than the base side of the chain knocker 940 so that the chain knocker 940 stops when it comes in contact with clamp 1320. Clamp 1310 which includes a sensor is attached securely to the camera cable 110 in a position behind the camera assembly 150. The camera includes LED's which can be modulated to transmit a signal which can be received by the sensor in clamp 1310. Clamp 1310 is communicably coupled to clamp 1320. The modulated signal from the LEDs can be received by the sensor in clamp 1310 and used to control the opening and closing of clamp 1320.

FIG. 13C illustrates details of an exemplary embodiment which include an additional transmitter 1340 for transmitting control signals to open or close clamp 1320 via the sensor included with clamp 1310. In this exemplary embodiment, transmitter 1340 may be configured to send a wireless radio signal.

The scope of the invention is not intended to be limited to the aspects shown herein but are to be accorded the full scope consistent with the disclosures herein and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the following claims and their equivalents.

We claim:

1. A method for using a cable handling device, comprising:
    attaching a cable, with a camera assembly disposed at a distal end of the cable, by inserting the cable through the center of a cable guide;
    attaching a flex-shaft, with a cutting mechanism disposed at a distal end of the flex-shaft, through a cable guide stop attached to an outer surface of the cable guide, wherein a proximal end of the cutting mechanism includes an end piece that is bigger in diameter than a distal end of the cable guide stop, thereby preventing the cutting mechanism from moving through the cable guide stop in a reverse direction towards the camera assembly but allowing it to move freely in a forward direction away from the camera assembly;

deploying both the cable and the flex-shaft into a pipe or cavity by feeding the cable into the pipe or cavity until a desired location inside the pipe or cavity is reached as determined by viewing images of at least a partial blockage of the pipe or cavity provided by a camera assembly imaging device;

separating the camera assembly and the cutting mechanism by moving at least one of the cable and the flex-shaft until a desired separation distance between the camera assembly and the cutting mechanism is achieved; and removing at least part of the partial blockage by the pipe or cavity by actuating the cutting mechanism.

2. The method of claim 1, wherein the camera assembly comprises a camera module assembly including the imaging device and a plurality of LEDs, wherein the LEDs are enclosed by a transparent window so that their illumination faces outward towards the distal end of the camera assembly, and wherein the LEDs are modulated to transmit a control signal to a sensor attached to a second cable guide.

3. The method of claim 1, further including a second cable guide and second cable guide assembly, wherein a sensor is attached to the second cable guide, the method further comprising sending a control signal to the second cable guide assembly to clamp the flex-shaft, wherein the control signal is a wireless control signal.

4. The method of claim 3, wherein the sensor comprises a three-axis magnetometer configured to communicate with a second sensor located within the camera assembly, wherein the second sensor is configured to modulate an electromagnetic signal received by the three-axis magnetometer.

5. The method of claim 4, wherein the electromagnetic signal is a 512 Hz signal or a 32 kHz signal.

6. The method of claim 4, wherein the second sensor comprises a sonde or other locator beacon capable of emitting a dipole electromagnetic field signal at a constant frequency.

7. The method of claim 1, further comprising a steering stick attached to a distal end of the camera assembly, wherein the steering stick allows a user to steer a direction the camera moves by pointing the steering stick in a desired direction and exerting force on the cable in the desired direction.

8. The method of claim 1, wherein the cable guide and a second cable guide are attached to a camera module assembly.

9. The method of claim 8, wherein the cable guide and the second cable guide comprise a rigid material such that the camera head and a jetter are steered by applying a rotating force to at least one of the cable and the flex-shaft.

10. The method of claim 1, further comprising sending a wireless signal from a wireless transceiver operatively coupled to a drum, to which the cable is attached, to the cable handling device.

* * * * *